US008300042B2

(12) United States Patent
Bell

(10) Patent No.: US 8,300,042 B2
(45) Date of Patent: Oct. 30, 2012

(54) INTERACTIVE VIDEO DISPLAY SYSTEM USING STROBED LIGHT

(75) Inventor: Matthew Bell, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1296 days.

(21) Appl. No.: 11/982,290

(22) Filed: Oct. 31, 2007

(65) Prior Publication Data

US 2008/0062123 A1 Mar. 13, 2008

Related U.S. Application Data

(63) Continuation-in-part of application No. 10/946,263, filed on Sep. 20, 2004, now Pat. No. 8,035,612, which is a continuation-in-part of application No. 10/160,217, filed on May 28, 2002, now Pat. No. 7,259,747.

(60) Provisional application No. 60/504,375, filed on Sep. 18, 2003, provisional application No. 60/514,024, filed on Oct. 24, 2003, provisional application No. 60/528,439, filed on Dec. 9, 2003, provisional application No. 60/554,520, filed on Mar. 18, 2004, provisional application No. 60/296,189, filed on Jun. 5, 2001.

(51) Int. Cl.
*G09G 5/00* (2006.01)

(52) U.S. Cl. ........ 345/418; 345/156; 345/158; 345/427; 345/469; 345/473; 345/474; 345/475; 463/30; 463/40

(58) Field of Classification Search .................. 345/629, 345/418–434, 471–475, 8, 156–159, 174; 463/30–43, 58; 382/154
See application file for complete search history.

(56) References Cited

U.S. PATENT DOCUMENTS

| 2,917,980 | A | 12/1959 | Grube et al. |
| 3,068,754 | A | 12/1962 | Benjamin et al. |
| 3,763,468 | A | 10/1973 | Ovshinsky et al. |
| 4,053,208 | A | 10/1977 | Kato et al. |
| 4,275,395 | A | 6/1981 | Dewey et al. |

(Continued)

FOREIGN PATENT DOCUMENTS

EP 0055366 7/1982

(Continued)

OTHER PUBLICATIONS

International Preliminary Report on Patentability for PCT/US2008/059900, filed on Apr. 10, 2008.

(Continued)

*Primary Examiner* — Jin-Cheng Wang
(74) *Attorney, Agent, or Firm* — Shook, Hardy & Bacon L.L.P.

(57) ABSTRACT

An interactive video display system uses strobing light to allow easy and unencumbered interaction between a person and projected video images. A camera may be synchronized to the strobing light and the strobing light may be in an infrared spectral range. A processing system detects images of a human in the field of view of the camera and controls the display so that the projected video images are changed based on an interaction between the human and the projected video images. The system may project the video images on a surface around the person and may move the projected video images on the surface based on a movement of the person. The projected video images may include computer-generated characters and/or virtual objects that react to the movement of a person.

13 Claims, 7 Drawing Sheets

U.S. PATENT DOCUMENTS

| | | | |
|---|---|---|---|
| 4,573,191 A | 2/1986 | Kidode et al. | |
| 4,725,863 A | 2/1988 | Dumbreck et al. | |
| 4,843,568 A | 6/1989 | Krueger | |
| 4,887,898 A | 12/1989 | Halliburton et al. | |
| 4,948,371 A | 8/1990 | Hall | |
| 5,001,558 A | 3/1991 | Burley | |
| 5,138,304 A | 8/1992 | Bronson | |
| 5,151,718 A | 9/1992 | Nelson | |
| 5,239,373 A | 8/1993 | Tang | |
| 5,276,609 A | 1/1994 | Durlach | |
| 5,319,496 A | 6/1994 | Jewell et al. | |
| 5,325,472 A | 6/1994 | Horiuchi | |
| 5,325,473 A | 6/1994 | Monroe | |
| 5,426,474 A | 6/1995 | Rubstov et al. | |
| 5,436,639 A | 7/1995 | Arai | |
| 5,442,252 A | 8/1995 | Golz | |
| 5,454,043 A | 9/1995 | Freeman | |
| 5,497,269 A | 3/1996 | Gal | |
| 5,510,828 A | 4/1996 | Lutterbach | |
| 5,526,182 A | 6/1996 | Jewell et al. | |
| 5,528,263 A | 6/1996 | Platzker | |
| 5,528,297 A | 6/1996 | Seegert | |
| 5,534,917 A | 7/1996 | MacDougall | |
| 5,548,694 A | 8/1996 | Gibson | |
| 5,591,972 A | 1/1997 | Noble | |
| 5,633,691 A | 5/1997 | Vogeley | |
| 5,703,637 A | 12/1997 | Miyazaki | |
| 5,808,784 A | 9/1998 | Ando et al. | |
| 5,846,086 A * | 12/1998 | Bizzi et al. | 434/247 |
| 5,861,881 A | 1/1999 | Freeman et al. | |
| 5,882,204 A | 3/1999 | Iannazo | |
| 5,923,380 A | 7/1999 | Yang | |
| 5,953,152 A | 9/1999 | Hewlett | |
| 5,969,754 A | 10/1999 | Zeman | |
| 5,978,136 A | 11/1999 | Ogawa et al. | |
| 5,982,352 A | 11/1999 | Pryor | |
| 6,008,800 A | 12/1999 | Pryor | |
| 6,058,397 A | 5/2000 | Barrus et al. | |
| 6,075,895 A | 6/2000 | Qiao | |
| 6,084,979 A | 7/2000 | Kanada | |
| 6,088,612 A | 7/2000 | Blair | |
| 6,097,369 A | 8/2000 | Wambach | |
| 6,106,119 A | 8/2000 | Edwards | |
| 6,118,888 A | 9/2000 | Chino et al. | |
| 6,125,198 A | 9/2000 | Onda | |
| 6,166,744 A | 12/2000 | Jaszlics | |
| 6,176,782 B1 | 1/2001 | Lyons | |
| 6,198,487 B1 | 3/2001 | Fortenbery | |
| 6,198,844 B1 | 3/2001 | Nomura | |
| 6,217,449 B1 * | 4/2001 | Kaku | 463/36 |
| 6,263,339 B1 | 7/2001 | Hirsch | |
| 6,270,403 B1 * | 8/2001 | Watanabe et al. | 463/7 |
| 6,278,418 B1 * | 8/2001 | Doi | 345/7 |
| 6,292,171 B1 | 9/2001 | Fu et al. | |
| 6,304,267 B1 * | 10/2001 | Sata | 345/427 |
| 6,308,565 B1 | 10/2001 | French | |
| 6,323,895 B1 * | 11/2001 | Sata | 348/39 |
| 6,333,735 B1 | 12/2001 | Anvekar | |
| 6,335,977 B1 | 1/2002 | Kage | |
| 6,339,748 B1 | 1/2002 | Hiramatsu | |
| 6,349,301 B1 | 2/2002 | Mitchell et al. | |
| 6,353,428 B1 | 3/2002 | Maggioni | |
| 6,359,612 B1 | 3/2002 | Peter et al. | |
| 6,388,657 B1 | 5/2002 | Natoli | |
| 6,394,896 B2 * | 5/2002 | Sugimoto | 463/3 |
| 6,400,374 B2 | 6/2002 | Lanier | |
| 6,407,870 B1 | 6/2002 | Hurevich et al. | |
| 6,414,672 B2 | 7/2002 | Rekimoto | |
| 6,445,815 B1 * | 9/2002 | Sato | 382/154 |
| 6,454,419 B2 | 9/2002 | Kitazawa | |
| 6,480,267 B2 | 11/2002 | Yanagi et al. | |
| 6,491,396 B2 | 12/2002 | Karasawa et al. | |
| 6,501,515 B1 | 12/2002 | Iwamura | |
| 6,522,312 B2 * | 2/2003 | Ohshima et al. | 345/8 |
| 6,545,706 B1 | 4/2003 | Edwards et al. | |
| 6,552,760 B1 | 4/2003 | Gotoh et al. | |
| 6,598,978 B2 | 7/2003 | Hasegawa | |
| 6,607,275 B1 | 8/2003 | Cimini et al. | |
| 6,611,241 B1 | 8/2003 | Firester | |
| 6,654,734 B1 | 11/2003 | Mani et al. | |
| 6,658,150 B2 | 12/2003 | Tsuji | |
| 6,661,918 B1 | 12/2003 | Gordon et al. | |
| 6,677,969 B1 | 1/2004 | Hongo | |
| 6,707,054 B2 | 3/2004 | Ray | |
| 6,707,444 B1 | 3/2004 | Hendriks et al. | |
| 6,712,476 B1 | 3/2004 | Ito et al. | |
| 6,720,949 B1 | 4/2004 | Pryor | |
| 6,732,929 B2 | 5/2004 | Good et al. | |
| 6,747,666 B2 | 6/2004 | Utterback | |
| 6,752,720 B1 * | 6/2004 | Clapper et al. | 463/58 |
| 6,754,370 B1 | 6/2004 | Hall-Holt et al. | |
| 6,791,700 B2 | 9/2004 | Omura et al. | |
| 6,826,727 B1 | 11/2004 | Mohr et al. | |
| 6,831,664 B2 | 12/2004 | Marmaropoulos et al. | |
| 6,871,982 B2 | 3/2005 | Holman et al. | |
| 6,877,882 B1 | 4/2005 | Haven et al. | |
| 6,912,313 B2 | 6/2005 | Li | |
| 6,965,693 B1 | 11/2005 | Kondo et al. | |
| 6,971,700 B2 | 12/2005 | Blanger et al. | |
| 6,975,360 B2 | 12/2005 | Slatter | |
| 6,999,600 B2 | 2/2006 | Venetianer | |
| 7,015,894 B2 | 3/2006 | Morohoshi | |
| 7,042,440 B2 | 5/2006 | Pryor | |
| 7,054,068 B2 | 5/2006 | Yoshida et al. | |
| 7,068,274 B2 | 6/2006 | Welch et al. | |
| 7,069,516 B2 | 6/2006 | Rekimoto | |
| 7,088,508 B2 | 8/2006 | Ebina et al. | |
| 7,149,262 B1 | 12/2006 | Nayar et al. | |
| 7,158,676 B1 | 1/2007 | Rainsford | |
| 7,170,492 B2 | 1/2007 | Bell | |
| 7,190,832 B2 | 3/2007 | Frost et al. | |
| 7,193,608 B2 | 3/2007 | Stuerzlinger | |
| 7,227,526 B2 | 6/2007 | Hildreth et al. | |
| 7,259,747 B2 | 8/2007 | Bell | |
| 7,262,874 B2 | 8/2007 | Suzuki | |
| 7,289,130 B1 * | 10/2007 | Satoh et al. | 345/629 |
| 7,330,584 B2 | 2/2008 | Weiguo et al. | |
| 7,339,521 B2 | 3/2008 | Scheidemann et al. | |
| 7,348,963 B2 | 3/2008 | Bell | |
| 7,379,563 B2 | 5/2008 | Shamaie | |
| 7,382,897 B2 | 6/2008 | Brown et al. | |
| 7,394,459 B2 | 7/2008 | Bathiche et al. | |
| 7,428,542 B1 | 9/2008 | Fink et al. | |
| 7,536,032 B2 | 5/2009 | Bell | |
| 7,576,727 B2 | 8/2009 | Bell | |
| 7,619,824 B2 | 11/2009 | Poulsen | |
| 7,710,391 B2 | 5/2010 | Bell et al. | |
| 7,737,636 B2 | 6/2010 | Li et al. | |
| RE41,685 E | 9/2010 | Feldman et al. | |
| 7,809,167 B2 | 10/2010 | Bell | |
| 7,834,846 B1 | 11/2010 | Bell | |
| 2001/0011035 A1 * | 8/2001 | Sugimoto | 463/3 |
| 2001/0012001 A1 | 8/2001 | Rekimoto et al. | |
| 2001/0033675 A1 | 10/2001 | Maurer et al. | |
| 2002/0006583 A1 | 1/2002 | Michiels et al. | |
| 2002/0032697 A1 | 3/2002 | French et al. | |
| 2002/0041327 A1 | 4/2002 | Hildreth | |
| 2002/0064382 A1 | 5/2002 | Hildreth | |
| 2002/0081032 A1 | 6/2002 | Chen et al. | |
| 2002/0103617 A1 | 8/2002 | Uchiyama | |
| 2002/0105623 A1 | 8/2002 | Pinhanez | |
| 2002/0130839 A1 | 9/2002 | Wallace et al. | |
| 2002/0140682 A1 | 10/2002 | Brown et al. | |
| 2002/0178440 A1 | 11/2002 | Agnihorti | |
| 2002/0186221 A1 | 12/2002 | Bell | |
| 2003/0032484 A1 * | 2/2003 | Ohshima et al. | 463/43 |
| 2003/0076293 A1 | 4/2003 | Mattsson | |
| 2003/0091724 A1 | 5/2003 | Mizoguchi | |
| 2003/0093784 A1 | 5/2003 | Dimitrova | |
| 2003/0098819 A1 | 5/2003 | Sukthankar et al. | |
| 2003/0103030 A1 | 6/2003 | Wu | |
| 2003/0113018 A1 | 6/2003 | Nefian et al. | |
| 2003/0122839 A1 | 7/2003 | Matraszek et al. | |
| 2003/0137494 A1 | 7/2003 | Tulbert | |
| 2003/0161502 A1 | 8/2003 | Morihara et al. | |
| 2003/0178549 A1 | 9/2003 | Ray | |
| 2004/0015783 A1 | 1/2004 | Lennon et al. | |

| | | |
|---|---|---|
| 2004/0046736 A1 | 3/2004 | Pryor |
| 2004/0046744 A1 | 3/2004 | Rafii |
| 2004/0073541 A1 | 4/2004 | Lindblad et al. |
| 2004/0091110 A1 | 5/2004 | Barkans |
| 2004/0183775 A1 | 9/2004 | Bell |
| 2005/0088407 A1 | 4/2005 | Bell et al. |
| 2005/0089194 A1 | 4/2005 | Bell |
| 2005/0104506 A1 | 5/2005 | Youh et al. |
| 2005/0110964 A1 | 5/2005 | Bell et al. |
| 2005/0122308 A1 | 6/2005 | Bell et al. |
| 2005/0132266 A1 | 6/2005 | Ambrosino et al. |
| 2005/0147282 A1 | 7/2005 | Fujii |
| 2005/0162381 A1 | 7/2005 | Bell et al. |
| 2005/0185828 A1 | 8/2005 | Semba et al. |
| 2005/0195598 A1 | 9/2005 | Dancs et al. |
| 2005/0265587 A1 | 12/2005 | Schneider |
| 2006/0132432 A1 | 6/2006 | Bell |
| 2006/0168515 A1 | 7/2006 | Dorsett et al. |
| 2006/0184993 A1 | 8/2006 | Goldthwaite et al. |
| 2006/0187545 A1 | 8/2006 | Doi |
| 2006/0227099 A1 | 10/2006 | Han et al. |
| 2006/0242145 A1 | 10/2006 | Krishnamurthy |
| 2006/0256382 A1 | 11/2006 | Matraszek et al. |
| 2007/0285419 A1* | 12/2007 | Givon ............................ 345/420 |
| 2008/0090484 A1 | 4/2008 | Lee et al. |
| 2008/0150890 A1 | 6/2008 | Bell et al. |
| 2008/0150913 A1 | 6/2008 | Bell et al. |
| 2008/0252596 A1 | 10/2008 | Bell et al. |
| 2009/0027337 A1 | 1/2009 | Hildreth |
| 2009/0077504 A1 | 3/2009 | Bell et al. |
| 2009/0102788 A1 | 4/2009 | Nishida et al. |
| 2009/0225196 A1 | 9/2009 | Bell |
| 2009/0235295 A1 | 9/2009 | Bell et al. |
| 2009/0251685 A1 | 10/2009 | Bell |
| 2010/0026624 A1 | 2/2010 | Bell |
| 2010/0039500 A1 | 2/2010 | Bell et al. |
| 2010/0060722 A1 | 3/2010 | Bell et al. |
| 2010/0121866 A1 | 5/2010 | Bell et al. |

FOREIGN PATENT DOCUMENTS

| | | |
|---|---|---|
| EP | 0626636 | 11/1994 |
| EP | 0913790 | 5/1999 |
| EP | 1 689 172 A1 | 6/2002 |
| JP | 57094672 | 6/1982 |
| KR | 2003-0058894 | 7/2003 |
| WO | WO 9838533 | 9/1998 |
| WO | WO 00/16562 A1 | 3/2000 |
| WO | WO 01/63916 A1 | 8/2001 |
| WO | WO 02/100094 A2 | 12/2002 |
| WO | WO 2004055776 | 7/2004 |
| WO | WO 2004/097741 A1 | 11/2004 |
| WO | WO 2005/041578 A2 | 5/2005 |
| WO | WO 2005/041579 A3 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

Provision of the minutes in European Application No. 02739710.8 dated Dec. 28, 2009.
Decision revoking the European Patent in European Application No. 02739710.8 dated Dec. 28, 2009.
Bastian Leibe, et al., "Toward Spontaneous Interaction with the Perceptive Workbench," Virtual Reality, IEEE Computer Graphics and Application, Nov./Dec. 2000.
International Preliminary Report on Patentability for PCT/US2008/10750, filed Sep. 15, 2008.
Letter of the opponent O2 dated May 28, 2010 in European Application No. 02739710.8, filed Jun. 4, 2002.
Notice of Opposition in European Application No. 02739710.8 dated Aug. 23, 2010.
2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of European Application No. 02739710.8 filed Jun. 4, 2002.
Affidavit of Daniel Barthels regarding EffecTV, dated May 15, 2007 (partial machine translation), cited during opposition of European Application No. 02739710.8, filed Jun. 4, 2002.
Announcement: Workshop on Perceptual User Interfaces, The Banff Rocky Mountain Resort, Banff, Alberta, Canada, Oct. 20-21, 1997, can be found at <http://www.research.microsoft.com/PUIWorkshop/>, cited during opposition of European Application No. 02739710.8, filed Jun. 4, 2002.
ART+COM Bodymover 2000, as downloaded on Aug. 21, 2009 from <http://www.artcom.de/index.php?option=com_acprojects&page=6&id=28&Itemid=144&details=0&lang=en>, cited during opposition of European Application No. 02739710.8, filed Jun. 4, 2002.
ARTCOM: "Project Bodymover 2000," available online at <HTTP://ARTCOM.DE/IMAGES/STORIES/2_PRO_BODYMOVER/BODYMOVER_D.PDF> (English).
Article 96(2) Communication dated Feb. 25, 2005 in European Application No. 02739710.8.
Article 96(2) Communication dated Mar. 31, 2004 in European Application No. 02739710.8.
Brown, Matthew, et al. "Multi-Image Matching using Multi-Scale Oriented Patches," Technical Report, Dec. 2004, pp. 1-48, available online at <ftp://ftp.research.microsoft.com/pub/tr/TR-2004-133.pdf>.
Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.
Buxton, Bill, "Multi-Touch Systems That I Have Known and Loved," accessed Mar. 21, 2007, http://billbuxton.com/multitouchOverview.html.
Communication dated Dec. 10, 2008 from Patentanwalt attaching article by Katy Bachman, entitled "Reactrix Up for Sale," cited during opposition of European Application No. 02739710.8, filed Jun. 4, 2002.
Crouser, P.D., et al., "Unattenuated tracer particle extraction through time-averaged, background image subtraction with outlier rejection," Experiments in Fluids, 22, 1997, 220-228, Springer-Verlag.
EffecTV Software Source: effect module, dated May 20, 2001 (German); cited during opposition of European Application No. 02739710.8, filed Jun. 4, 2002.
Extended Search Report for European Application No. 06010825.5, filed Jun. 4, 2002, dated Jul. 10, 2006.
Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM-2002, pp. 155-163.
Frisken, Sarah F. et al., "Adaptively Sampled Distance Fields: A General Representation of Shape for Computer Graphics," 2000, Proc. of the 27th Annual Conf. on Computer Graphics and Interactive Techniques, pp. 249-254.
Goetz, Frank, et al., "An XML-based Visual Shading Language for Vertex and Fragment Shaders," 3D Technologies for the World Wide Web, Proceedings of Ninth International Conference on 3D Technology; ACM—2004; pp. 87-97.
Haller, Michael et al., "Coeno-Storyboard: An Augmented Surface for Storyboard Presentations," Mensch & Computer 2005, Sep. 4-7, 2005, Linz, Austria.
Han, Jefferson Y., "Low-Cost Multi-Touch Sensing Through Frustrated Total Internal Reflection," 2005, ACM Symposium on User Interface Software and Technology (UIST).
Hoff, Kenneth E. III et al, "Fast and Simple 2D Geometric Proximity Queries Using Graphics Hardware," 2001, Proc. of the 2001 Symposium on Interactive 3D Graphics, pp. 145-148.
International Preliminary Examination Report for PCT/US2002/017843, filed Jun. 4, 2002.
International Preliminary Report on Patentability for PCT/US2004/035477, filed Oct. 25, 2004.
International Preliminary Report on Patentability for PCT/US2004/035478, filed Oct. 25, 2004.

International Preliminary Report on Patentability for PCT/US2004/041318, filed Dec. 9, 2004.
International Preliminary Report on Patentability for PCT/US2004/041319, filed Dec. 9, 2004.
International Preliminary Report on Patentability for PCT/US2004/041320, filed Dec. 9, 2004.
International Preliminary Report on Patentability for PCT/US2005/008984, filed Mar. 18, 2005.
International Preliminary Report on Patentability for PCT/US2006/030720, filed on Aug. 4, 2006.
International Search Report for PCT/US03/40321, filed Dec. 15, 2003.
International Search Report for PCT/US2002/017843, filed Jun. 4, 2002, dated Feb. 5, 2003.
International Search Report for PCT/US2004/035477, filed Oct. 25, 2004.
Invitation to Pay Additional Fees and Partial ternational Search Report on Patentability for PCT/US2004/035478, filed Oct. 25, 2004.
International Search Report for PCT/US2004/035478, filed Oct. 25, 2004.
International Search Report for PCT/US2004/041318, filed Dec. 9, 2004.
International Search Report for PCT/US2004/041319, filed Dec. 9, 2004.
International Search Report for PCT/US2004/041320, filed Dec. 9, 2004.
International Search Report for PCT/US2005/008984, filed Mar. 18, 2005.
International Search Report for PCT/US2006/030720, filed Aug. 4, 2006.
International Search Report for PCT/US2008/059900, filed Apr. 10, 2008.
International Search Report for PCT/US2008/10750, filed Sep. 15, 2008.
Ivars Peterson, "Artificial reality; combining a person's live video image with computer graphics suggests novel ways of working and playing with computers" Science News, Jun. 22, 1985.
Jabri, Sumer et al., "Detection and Location of People in Video Images Using Adaptive Fusion of Color and Edge Information;" presented at the Int. Conf. Pattern Recognition, Barcelona, Spain, 2000.
Joyce, Arthur W. III, et al., "Implementation and capabilities of a virtual interaction system," 1998, Proc. 2nd Euro. Conf. Disability, Virtual Reality & Assoc. Tech., Skovde, Sweden, pp. 237-245.
Katz, Itai et al., "A Multi-Touch Surface Using Multiple Cameras," 2007, Advanced Concepts for Intelligent Vision Systems, vol. 4678/2007.
Kjeldesn, Rick et al., "Dynamically Reconfigurable Vision-Based User Interfaces," Apr. 2003, 3rd International Conference on Vision Systems (ICVVS '03), Graz, Austria, pp. 6-12.
Kreuger, Myron, "Videoplace—An Artificial Reality," Apr. 1985, Conference on Human Factors in Computing Systems, San Francisco, California, pp. 35-40.
Lantagne, Michel, et al., "VIP: Vision tool for comparing Images of People," Vision Interface 2003, pp. 1-8.
Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.
Levin, Golan "Computer Vision for Artists and Designers: Pedagogic Tools and Techniques for Novice Programmers," Aug. 2006, AI & Society, vol. 20, Issue 4, pp. 462-482.
Letter dated May 16, 2007 from Christian Zuckschwerdt regarding EffecTV, (partial machine translation), cited during opposition of European Application No. 02739710.8, filed Jun. 4, 2002.
Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-111.
Livingston, Mark Alan, "Vision-based Tracking with Dynamic Structured Light for Video See-through Augmented Reality," 1998, Ph.D. Dissertation, University of North Carolina at Chapel Hill.
Malik, Shahzad et al., "Visual Touchpad: A Two-Handed Gestural Input Device," Oct. 13-15, 2004, International Conference on Multimodal Interfaces (ICMI '04).
MacIver, Malcolm, et al., "Body Electric," 2003, art installation, description available online at <http://www.neuromech.northwestern.edu/uropatagium/#ArtSci>.
Microsoft Surface multi-touch interface table unveiled, May 30, 2007, downloaded from http://www.dancewithshadows.com/tech/microsoft-surface.asp.
Microsoft Surface Web Page, downloaded from http://www.microsoft.com/surface/Pages/Product/WhatIs.aspx on Sep. 24, 2009.
Experience Microsoft Surface, downloaded from http://www.microsoft.com/surface/Pages/Product/Specifications.aspx on Sep. 24, 2009.
Microsoft Surface, downloaded from http://en.wikipedia.org/wiki/Microsoft_surface on Sep. 24, 2009.
Mitsubishi DiamondTouch, http://www.merl.com/projects/DiamondTouch/, visited Mar. 21, 2007.
Mo, Zhenyao "SmartCanvas: A Gesture-Driven Intelligent Drawing Desk System," Jan. 9-12, 2005, Proceedings of Intelligent User Interfaces (IUI '05).
Morano, Raymond A. et al., "Structured Light Using Pseudorandom Codes," Mar. 1998, IEEE Transactions on Pattern Analysis and Machine Intelligence, vol. 20, No. 3.
Morris, T. et al., "Real-Time Fingertip Detection for Hand Gesture Recognition," Sep. 9-11, 2002, Advanced Concepts for Intelligent Vision Systems (ACIVS '04), Ghent University, Belgium.
Notice of Opposition in European Application No. 02739710.8 dated May 14, 2007.
Observation by third party Michael Saup dated Jan. 17, 2005, cited during opposition of European Application No. 02739710.8, filed Jun. 4, 2002.
Observation by third party Petra Trefzger dated Jan. 17, 2005, cited during opposition of European Application No. 02739710.8, filed Jun. 4, 2002.
Observation by third party Simon Penny dated Jan. 17, 2005, cited during opposition of European Application No. 02739710.8, filed Jun. 4, 2002.
Reactrix, Inc. website, Mar. 28, 2003, <http://web.archive.org/web/20030328234205/http://www.reactrix.com> and <http://web.archive.org/web/20030328234205/http://www.reactrix.com/webdemo.php>.
Rokeby, David, "softVNS 2 real time video processing and tracking software for Max;" SoftVNS 2 downloads, as downloaded from <http://homepage.mac.com/davidrokeby/softVNS.html> on Mar. 16, 2007.
Sato, Yoichi, et al., "Fast Tracking of Hands and Fingertips in Infrared Images for Augmented Desk Interface," Mar. 2000, 4th International Conference on Automatic Face -and Gesture-Recognition, Grenoble, France.
Schneider, John K., "Improved Fingerprint System Using Rolled and Multi-segmented Techniques," Provisional U.S. Appl. No. 60/575,952, filed Jun. 1, 2004, pp. 1-6.
Screenshots of Reactrix Product Demo Video, Mar. 28, 2003, <http://web.archive.org/web/20030407174258/http://www.reactrix.com/demo/reactrix_demo.wmv>.
Sonneck, Georg, et al., "Optimized One-to-One Personalization of Web Applications using a Graph Based Model," IEEE-22, Apr. 26, 2003, 9 pgs.
Summons to Attend Oral Proceedings in European Application No. 02739710.8, dated Aug. 12, 2005.
Summons to Attend Oral Proceedings in European Application No. 02739710.8, dated Jun. 12, 2009.
Supreme Particles, "PLASMA/Architexture," 1994, available online at <http://www.particles.de/paradocs/plasma/index.html>.
Tan, P, et al., "Highlight Removal by Illumination-Constrained Inpainting," Ninth IEEE International Conference on Computer Vision, 2003.
The History of Microsoft Surface, downloaded from http://www.microsoft.com/presspass/presskits/surfacecomputing/docs/SurfaceHistoryBG.doc on Sep. 24, 2009.

Torr, P.H.S. et al., "The Development and Comparison of Robust Methods for Estimating the Fundamental Matrix," 1997, International Journal of Computer Vision, vol. 24, No. 3, pp. 271-300.

Toth, Daniel et al., "'Illumination-Invariant Change Detection,'" 2000 4th IEEE Southwest Symposium on Image Analysis and Interpretation, p. 3.

Vogt, Florian et al., "Highlight Substitution in Light Fields," IEEE International Conference on Image Processing 2002.

Wang, Junxian, et al., "Specular reflection removal for human detection under aquatic environment," 2004 IEEE Conference on Computer and Pattern Recognition Workshop (CVPRW04) vol. 8, p. 130.

Wilson, Andrew, "PlayAnywhere: A Compact Interactive Tabletop Projection-Vision System," ACM Symposium on User Interface Software and Technology (UIST), 2005.

Written Opinion for PCT/US2002/017843, filed Jun. 4, 2002, dated Feb. 5, 2003.

Written Opinion of the International Searching Authority for PCT/US2004/035477, filed Oct. 25, 2004.

Written Opinion of the International Searching Authority for PCT/US2004/035478, filed Oct. 25, 2004.

Written Opinion of the International Searching Authority for PCT/US2004/041318, filed Dec. 9, 2004.

Written Opinion of the International Searching Authority for PCT/US2004/041319, filed Dec. 9, 2004.

Written Opinion of the International Searching Authority for PCT/US2004/041320, filed Dec. 9, 2004.

Written Opinion of the International Searching Authority for PCT/US2005/008984, filed Mar. 18, 2005.

Written Opinion of the International Searching Authority for PCT/US2006/030720, filed Aug. 4, 2006.

Written Opinion of the International Searching Authority for PCT/US2008/059900, filed Apr. 10, 2008.

Extended Search Report for European Application No. 08830473.8, dated Apr. 19, 2011.

Maria Langer, "Mac OS X 10.2: Visual QuickStart Guide," Sep. 17, 2002, Peachpit Press, p. 111.

Official Report in Australian Application No. 2008299883, dated Dec. 8, 2010.

Official Communication in Korean Patent Application No. 2006-7011270, dated Mar. 8, 2011.

Official Communication in Korean Patent Application No. 2006-7007617, dated Mar. 18, 2011.

Office Action in U.S. Appl. No. 10/160,217 (USPN 7,259,747), dated Apr. 22, 2004.

Office Action in U.S. Appl. No. 10/160,217 (USPN 7,259,747), dated Jun. 27, 2006.

Examiner Interview Summary Record in U.S. Appl. No. 10/160,217 (USPN 7,259,747), dated Aug. 15, 2006.

Notice of Allowance in U.S. Appl. No. 10/160,217 (USPN 7,259,747), dated Oct. 18, 2006.

Patent Withdrawal Notice in U.S. Appl. No. 10/160,217 (USPN 7,259,747), dated Mar. 22, 2007.

Notice of Allowance in U.S. Appl. No. 10/160,217 (USPN 7,259,747), dated Jun. 26, 2007.

Office Action in U.S. Appl. No. 10/866,495, dated Apr. 6, 2007.
Office Action in U.S. Appl. No. 10/866,495, dated Oct. 17, 2007.
Office Action in U.S. Appl. No. 10/866,495, dated Jan. 23, 2008.
Office Action in U.S. Appl. No. 10/866,495, dated Sep. 4, 2008.
Office Action in U.S. Appl. No. 10/866,495, dated Aug. 21, 2009.
Examiner Interview Summary Record in U.S. Appl. No. 10/866,495, dated Nov. 18, 2009.

Office Action in U.S. Appl. No. 10/946,084, dated Jul. 10, 2008.
Office Action in U.S. Appl. No. 10/946,084, dated Apr. 9, 2009.
Office Action in U.S. Appl. No. 10/946,084, dated Dec. 7, 2009.
Office Action in U.S. Appl. No. 10/946,084, dated Jun. 28, 2010.
Examiner Interview Summary Record in U.S. Appl. No. 10/946,084, dated Aug. 27, 2010.

Office Action in U.S. Appl. No. 10/946,084, dated Dec. 8, 2010.
Office Action in U.S. Appl. No. 10/946,084, dated Apr. 28, 2011.
Non-Final Rejection in U.S. Appl. No. 10/946,414 (USPN 7,710,391), dated Jan. 29, 2008.
Non-Final Rejection in U.S. Appl. No. 10/946,414 (USPN 7,710,391), dated Aug. 6, 2008.

Final Rejection in U.S. Appl. No. 10/946,414 (USPN 7,710,391), dated May 26, 2009.
Examiner Interview Summary in U.S. Appl. No. 10/946,414 (USPN 7,710,391), dated Jul. 28, 2009.
Notice of Allowance in U.S. Appl. No. 10/946,414 (USPN 7,710,391), dated Nov. 17, 2009.
Notice of Allowance in U.S. Appl. No. 10/946,414 (USPN 7,710,391), dated Feb. 22, 2010.
Examiner Interview Summary in U.S. Appl. No. 10/946,263, dated Oct. 20, 2008.
Non-Final Rejection in U.S. Appl. No. 10/946,263, dated Jan. 13, 2009.
Final Rejection in U.S. Appl. No. 10/946,263, dated Sep. 30, 2009.
Non-Final Rejection in U.S. Appl. No. 10/946,263, dated Jan. 25, 2010.
Examiner Interview Summary in U.S. Appl. No. 10/946,263, dated Apr. 22, 2010.
Non-Final Rejection in U.S. Appl. No. 10/946,263, dated Jul. 22, 2010.
Examiner Interview Summary in U.S. Appl. No. 10/946,263, dated Sep. 22, 2010.
Notice of Allowance in U.S. Appl. No. 10/946,263, dated Jan. 4, 2011.
Notice of Allowance in U.S. Appl. No. 10/946,263, dated Mar. 21, 2011.
Non-Final Rejection in U.S. Appl. No. 11/101,900, dated Aug. 6, 2007.
Non-Final Rejection in U.S. Appl. No. 11/507,976, dated Sep. 17, 2007.
Final Rejection in U.S. Appl. No. 11/507,976, dated May 13, 2008.
Non-Final Rejection in U.S. Appl. No. 11/507,976, dated Oct. 29, 2008.
Notice of Allowance in U.S. Appl. No. 11/507,976, dated Sep. 9, 2009.
Notice of Allowance in U.S. Appl. No. 11/507,976, dated Jan. 20, 2010.
Notice of Allowance in U.S. Appl. No. 11/507,976, dated Jul. 13, 2010.
Official Communication in Chinese Application No. 200480034551.4, dated Feb. 19, 2008.
Official Communication in European Patent Application No. 04 813 622.0, dated Mar. 4, 2008.
Official Communication in Australian Application No. 2002312346, dated Nov. 14, 2006.
Official Communication in Canadian Patent Application No. 2,449,300, dated Nov. 9, 2009.
Official Communication in Chinese Application No. 02815206.9 dated Dec. 12, 2008.
Official Communication in Chinese Application No. 02815206.9 dated Sep. 25, 2009.
Official Communication in Chinese Application No. 02815206.9 dated Mar. 1, 2010.
Official Communication in Indian Patent Application No. 1582/KOLNP/2003, dated May 22, 2006.
Official Communication in Korean Patent Application No. 10-2003-7015990, dated Nov. 8, 2006.
Non-Final Rejection in U.S. Appl. No. 11/929,778, dated Jul. 27, 2010.
Examiner Interview Summary Record in U.S. Appl. No. 11/929,778, dated Sep. 22, 2010.
Notice of Allowance in U.S. Appl. No. 11/929,778, dated Jan. 3, 2011.
Notice of Allowance in U.S. Appl. No. 11/929,778, dated May 24, 2011.
Non-Final Rejection in U.S. Appl. No. 11/929,947, dated Oct. 21, 2010.
Examiner Interview Summary Record in U.S. Appl. No. 11/929,947, dated Dec. 14, 2010.
Notice of Allowance in U.S. Appl. No. 11/929,947, dated Apr. 1, 2011.
Non-Final Rejection in U.S. Appl. No. 11/083,851, dated Mar. 8, 2006.

Notice of Allowance in U.S. Appl. No. 11/083,851, dated Sep. 12, 2006.
Non-Final Rejection in U.S. Appl. No. 11/197,941, dated Mar. 8, 2006.
Non-Final Rejection in U.S. Appl. No. 11/197,941, dated Sep. 6, 2006.
Final Rejection in U.S. Appl. No. 11/197,941, dated Mar. 5, 2007.
Notice of Allowance in U.S. Appl. No. 11/197,941, dated Oct. 26, 2007.
U.S. Appl. No. 11/507,976, Matthew Bell, Interactive Video Display System, Aug. 21, 2006.
U.S. Appl. No. 10/737,730, Matthew Bell, Interactive Directed Light/Sound System, Dec. 15, 2003.
U.S. Appl. No. 10/974,044, Matthew Bell, Method and System for Processing Captured Image Information in an Interactive Video Display System, Oct. 25, 2004.
U.S. Appl. No. 10/973,335, Matthew Bell, Method and System for Managing an Interactive Video Display System, Oct. 25, 2004.
U.S. Appl. No. 10/866,495, Tipatat Chennavasin, Interactive Display System for Generating Images for Projection onto a Three-Dimensional Object, Jun. 10, 2004.
U.S. Appl. No. 10/946,263, Matthew Bell, Self-Contained Interactive Video Display System, Sep. 20, 2004.
U.S. Appl. No. 10/946,084, Matthew Bell, Self-Contained Interactive Video Display System, Sep. 20, 2004.
U.S. Appl. No. 10/946,414, Matthew Bell, Interactive Video Window Display System, Sep. 20, 2004.
U.S. Appl. No. 11/083,851, Matthew Bell, Interactive Video Display System, Mar. 18, 2005.
U.S. Appl. No. 11/197,941, Matthew Bell, Interactive Video Display System, Aug. 5, 2005.
U.S. Appl. No. 11/106,898, Malik Coates, Method and System for State-Based Control of Objects, Apr. 15, 2005.
U.S. Appl. No. 11/142,202, Matthew T. Bell, System and Method for Sensing a Feature of an Object in an Interactive Video Display, May 31, 2005.
U.S. Appl. No. 11/142,115, Steve Fink, Method and System for Combining Nodes into a Mega-Node, May 31, 2005.
U.S. Appl. No. 11/106,084, Matthew T. Bell, Method and System for Glare Resist Processing in an Interactive Video Display System, Apr. 14, 2005.
U.S. Appl. No. 11/101,900, John Paul D'India, Interactive Display System with Fluid Motion Visual Effect Capability, Apr. 8, 2005.
U.S. Appl. No. 11/634,044, Matthew Bell, Systems and Methods for Communication Between a Reactive Video System and a Mobile Communication Device, Dec. 4, 2006.
Elgammal, Ahmed et al., "Non-parametric Model for Background Subtraction," Jun. 2000, European Conference on Computer Vision, Lecture Notes on Computer Science, vol. 1843, pp. 751-767.
Lamarre, Mathieu and James J. Clark, "Background subtraction using competing models in the block-DCT domain," 2002, IEEE Comput Soc US, vol. 1, pp. 299-302.
Stauffer, Chris and W. Eric L. Grimson, "Learning Patterns of Activity Using Real-Time Tracking," Aug. 2000, IEEE Transaction on Pattern Analysis and Machine Intelligence, vol. 22, No. 8, pp. 747-757.
Harville, Michael et al., "Foreground Segmentation Using Adaptive Mixture Models in Color and Depth," 2001, Proc. of IEE Workshop on Detection and Recognition of Events in Video, pp. 3-11.
Kurapati, Kaushal et al., "A Multi-Agent TV Recommender," 2001, Workshop on Personalization in Future TV, pp. 1-8, XP02228385.
"EffecTV" Version 0.2.0 released Mar. 27, 2001, available online at <http://web.archive.org/web/20010101-20010625re_http://effectv.sourceforge.net>.
"Index of /EffecTV," available online at <http://effectv.cvs.sourceforge.net/effectv/EffecTV/?pathrev=rel_0_2_0>, downloaded on Apr. 30, 2007.
Freeman, William et al., "Computer vision for interactive computer graphics," May-Jun. 1998, IEEE Computer Graphics and Applications, vol. 18, No. 3, pp. 41-53.
GroundFX Document, GestureTek (Very Vivid, Inc.), description available online at <http://www.gesturetek.com/groundfx>, 2006.

Keays, Bill, "Using High-Bandwidth Input/Output in Interactive Art," Jun. 1999, Master's Thesis, Massachusetts Institute of Technology, School of Architecture and Planning.
Utterback, Camille and Achituv, Romy, "Text Rain," 1999, art installation, available online at <http://www.camilleutterback.com/textrain.html>.
Muench, Wolfgang, "Bubbles", 1999, Prix Ars Electronica Catalog 1999, Springer-Verlag, Berlin, Germany; available online at <http://hosting.zkm.de/wmuench/bub/text>.
Demarest, Ken, "Sand," 2000, Mine Control, art installation, available online at <http://www.mine-control.com>.
Sester, Marie, "Access," 2001, Interaction '99 Biennial Catalog, Gifu, Japan, available online at <http://www.accessproject.net/concept.html>.
Wellner, Pierre, "Interacting with paper on the DigitalDesk," Jul. 1993, Communications of the ACM, Special issue on computer augmented environments: back to the real world, vol. 36, Issue 7, pp. 87-96.
Foerterer, Holger, "Fluidum," 1999, art installation, description available online at <http://www.foerterer.com/fluidum>.
Trefzger, Petra, "Vorwerk," 2000, art installation, description available online at <http://www.petracolor.de>.
Foeterer, Holger, "Helikopter," 2001, art installation, description available online at <http://www.foerterer.com/helikopter>.
Mandala Systems, "Video Gesture Control System Concept," 1986, description available online at <http://www.vividgroup.com/tech.html>.
Kreuger, Myron, "Videoplace," 1969 and subsequent, summary available online at <http://www.jtnimoy.com/itp/newmediahistory/videoplace>.
Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.
Fujihata, Masaki, "Beyond Pages," 1995, art installation, description available online at <http://http://on1.zkm.de/zkm/werke/BeyondPages>.
Rogala, Miroslav, "Lovers Leap," 1994, art installation, Dutch Electronic Arts Festival, description available online at <http://http://wayback.v2.nl/DEAF/persona/rogala.html>.
Snibbe, Scott, "Boundary Functions," 1998, art installation, description available online at <http://snibbe.com/scott/bf/index.htm>.
Snibbe, Scott, "Screen Series," 2002-2003, art installation, description available online at <http://snibbe.com/scott/screen/index.html>.
Keays, Bill, "metaField Maze," 1998, exhibited at Siggraph'99 Emerging Technologies and Ars Electronica 1999, description available online at <http://www.billkeays.com/metaFieldInfosheet1A.pdf>.
Hemmer, Raphael Lozano, "Body Movies," 2002, art project/installation, description available online at <http://www.lozano-hemmer.com/eproyecto.html>.
Penny, Simon et al., "Body Electric," 2003, art installation, description available online at <http://www.neuromech.northwestern.edu/uropatagium/#ArtSci>.
Penny, Simon and Bernhardt, Andre, "Fugitive II," 2004, Australian Center for the Moving Image, art installation, description available online at <http://www.acmi.net.au/fugitive.jsp?>.
Rekimoto, J. and Matsushita, N., "Perceptual Surfaces: Towards a Human and Object Sensitive Interactive Display," 1997, Proc. of the Workshop on Perceptual User Interfaces, Banff, Canada, pp. 30-32.
Pinhanez, C., "The Everywhere Displays Projector: A Device to Create Ubiquitous Graphical Interfaces," 2001, Proc. of the UbiComp 2001 Conference, Ubiquitous Computing Lecture Notes in Computer Science, Springer-Verlag, Berlin, Germany, pp. 315-331.
Kjeldsen, R. et al., "Interacting with Steerable Projected Displays," 2002, Proc. of the 5th International Conference on Automatic Face and Gesture Recognition, Washington, D.C.
Pinhanez, C. et al., "Ubiquitous Interactive Graphics," 2002, IBM Research Report RC22495, available at <http://www.research.ibm.com/ed/publications/rc22495.pdf>.

Ringel, M. et al., "Barehands: Implement-Free Interaction with a Wall-Mounted Display," 2001, Proc. of the 2001 ACM CHI Conference on Human Factors in Computing Systems (Extended Abstracts), p. 367-368.

Sparacino, Flavia et al., "Media in performance: interactive spaces for dance, theater, circus and museum exhibits," 2000, IBM Systems Journal, vol. 39, No. 3-4, pp. 479-510.

Sparacino, Flavia, "(Some) computer vision based interfaces for interactive art and entertainment installations," 2001, INTER_FACE Body Boundaries, Anomalie digital_arts, No. 2, Paris, France.

Davis, J.W. and Bobick, A.F., "SIDEshow: A Silhouette-based Interactive Dual-screen Environment," Aug. 1998, MIT Media Lab Tech Report No. 457.

Paradiso, Joseph et al., "New Sensor and Music Systems for Large Interactive Surfaces," 2000, Proc. of the Interactive Computer Music Conference, Berlin, Germany, pp. 277-280.

Penny et al.; "Traces: Wireless Full Body Tracking in the Cave", Dec. 1999; Japan; ICAT Virtual Reality Conference; http://turing.ace.uci.edu/pennytexts/traces/.

Simon Penny; "Fugitive"; Jul. 1995; http://www.ace.uci.edu/penny/works/fugitive/fugitive.html.

Plasma; 3 Pages; http://www.particles.de/paradocs/plasma/index.html, in U.S. Appl. No. 10/160,217 on Aug. 8, 2005.

Jeff Khan; "Intelligent Room with a View"; www.realtimearts.net, Apr.-May 2004, RealTime Arts Magazine, Issue 60.

Bodymover Body Movement As a Meants to Obtain an Audiovisual, Spatial Experience 2000 ART+COM AG Berlin; http://www.artcom.de/index.php?option=com_acprojects&page=6&id=28&Itemid=144&details=0&lang=en, 2000.

"R111, The Transformation From Digital Information to Analog Matter" http://www.r111.org, Jan. 17, 2005.

"Supreme Particles; R111" URL:HTTP://WWW.R111.ORG, 1999, XP002989704.

Artcom: "Projekt Bodymover 2000; Koerperbewegung als Mittel zur Schaffung eines audio-visuellen Raum-Erlenbisses" <URL:HTTP://ARTCOM.DE/IMAGES/STORIES/2_PRO_BODYMOVER/BODYMOVER_D.PDF>,2000XP002989289.

Wellner P: "The Digital Desk Calculator:Tangible Manipulation on a Desk Top Display" Proceedings of the Symposium on User Interface Software and Technol (UIST), Hilton Head, S. Carolina, Nov. 11-13, 1991.

* cited by examiner

INTERACTIVE VIDEO DISPLAY SYSTEM USING STROBED LIGHT

CROSS REFERENCE TO RELATED APPLICATIONS

This application is a continuation-in-part and claims the priority benefit of U.S. patent application Ser. No. 10/946,263 filed Sep. 20, 2004 now U.S. Pat. No. 8,035,612 and titled "Self-Contained Interactive Video Display System," which claims the priority benefit of U.S. Patent Provisional Application Nos. 60/504,375 filed on Sep. 18, 2003 and titled "Self-Contained Interactive Video Display System," 60/514,024 filed on Oct. 24, 2003 and titled "Method and System for Processing Captured Image Information in an Interactive Video System," 60/528,439, filed on Dec. 9, 2003 and titled "Self-Contained Interactive Video Display System and Features Relating Thereto," and 60/554,520 filed on Mar. 18, 2004 titled "Method and System for Allowing a Camera to View an Area in Front of a Display by Imaging it Through the Display"; U.S. patent application Ser. No. 10/946,263 is also a continuation-in-part and claims the priority benefit of U.S. patent application Ser. No. 10/160,217 filed May 28, 2002, now U.S. Pat. No. 7,259,747, and titled "Interactive Video Display System," which claims the priority benefit of U.S. Provisional Patent Application No. 60/296,189 filed Jun. 5, 2001 and titled "Interactive Video Display System That Uses Video Input." The disclosure of each of the above patent applications is hereby incorporated by reference.

BACKGROUND

1. Field of the Invention

The present invention relates in general to image processing systems and more specifically to a system for receiving and processing an image of a human user to allow interaction with video displays.

2. Related Art

Image processing is used in many areas of analysis, education, commerce and entertainment. One aspect of image processing includes human-computer interaction by detecting human forms and movements to allow interaction with images. Applications of such processing can use efficient or entertaining ways of interacting with images to define digital shapes or other data, animate objects, create expressive forms, etc.

Detecting the position and movement of a human body is referred to as "motion capture." With motion capture techniques, mathematical descriptions of a human performer's movements are input to a computer or other processing system. Natural body movements can be used as inputs to the computer to study athletic movement, capture data for later playback or simulation, enhance analysis for medical purposes, etc.

Although motion capture provides benefits and advantages, motion capture techniques tend to be complex. Some techniques require the human actor to wear special suits with high-visibility points at several locations. Other approaches use radio-frequency or other types of emitters, multiple sensors and detectors, blue-screens, extensive post-processing, etc. Techniques that rely on simple visible-light image capture are usually not accurate enough to provide well-defined and precise motion capture.

Some motion capture applications allow an actor, or user, to interact with images that are created and displayed by a computer system. For example, an actor may stand in front of a large video screen projection of several objects. The actor can move, or otherwise generate, modify, and manipulate, the objects by using body movements. Different effects based on an actor's movements can be computed by the processing system and displayed on the display screen. For example, the computer system can track a path of the actor in front of the display screen and render an approximation, or artistic interpretation, of the path onto the display screen. The images with which the actor interacts can be e.g., on the floor, wall or other surface; suspended three-dimensionally in space, displayed on one or more monitors, projection screens or other devices. Any type of display device or technology can be used to present images with which a user can control or interact.

In some applications, such as point-of-sale, retail advertising, promotions, arcade entertainment sites, etc., it is desirable to capture the motion of an untrained user (e.g., a person passing by) in a very unobtrusive way. Ideally, the user will not need special preparation or training and the system will not use unduly expensive equipment. Also, the method and system used to motion capture the actor should, preferably, be invisible or undetectable to the user. Many real-world applications must work in environments where there are complex and changing background and foreground objects, short time intervals for the capture, changing lighting conditions and other factors that can make motion capture difficult.

SUMMARY

Embodiments of the invention include an interactive video display system including a display that projects video images onto a surface, a strobing lamp configured to illuminate the surface using strobed light, and a camera having exposures synchronized to the strobed light. The camera has a field of view that includes the surface. The embodiments of the invention further include a processing system that detects images of a human in the field of view using the camera, and controls the display so that the projected video images are changed based on an interaction between the human and the projected video images.

According to another embodiment of the invention, a method includes displaying an interactive video image by projecting video images onto a surface, illuminating the surface using strobed light, and synchronizing camera exposures to the strobed light. The camera has a field of view that includes the surface. The method further includes detecting images of a human in the field of view using the camera and changing the projected video images based on an interaction between the human and the projected video images.

According to another embodiment of the invention, an interactive video display system includes means for projecting video images onto a surface, means for illuminating the surface using strobed light, and means for capturing images in a field of view including the surface. The means for capturing images has exposures synchronized to the strobed light. The method further includes means for detecting images of a human in the captured images, and means for changing the projected video images based on an interaction between the human and the projected video images.

DETAILED DESCRIPTION

Several configurations of the invention are described below. In general, the present invention uses a first light source to illuminate a user, or another object. The first light source uses light that is not visible to humans. For example, infrared or ultraviolet light can be used. A camera that is sensitive to light at the wavelength range of the first light source is used to detect a user who is illuminated by the first light source. A computer (or other processing system) is used to process the detected object image and to generate images for display. A second light source (e.g., a projector, Video screen, etc.) is used to display the generated display images to a human user or viewers. The displayed images are at wavelengths that minimize interference with the camera's object detection. Typically, the visible spectrum is used to display the images.

In a preferred embodiment, the display surrounds the user such that the user's virtual presence is aligned with the user's physical presence. Thus, the virtual scene on the display has a physical location around the user, and the user's movement within the display will cause identical movement of the user's representation within the virtual scene. For example, the user can impinge on a virtual object's physical location and know that this will cause their virtual representation to touch the virtual object in the computer system. The use of the term "touch" or "touching" in this specification does not mean physical contact with an object, such as a person, and an image item. Rather the notion of touching means that the object's position and action in physical space is translated into an effect in a generated image, including effects of moving items in the generated images.

Displayed images or items can include objects, patterns, shapes or any visual pattern, effect, etc. Aspects of the invention can be used for applications such as interactive lighting effects for people at clubs or events, interactive advertising displays, characters and virtual objects that react to the movements of passers-by, interactive ambient lighting for public spaces such as restaurants, shopping malls, sports venues, retail stores, lobbies and parks, video game systems, and interactive informational displays. Other applications are possible and are within the scope of the invention.

Figure 1:
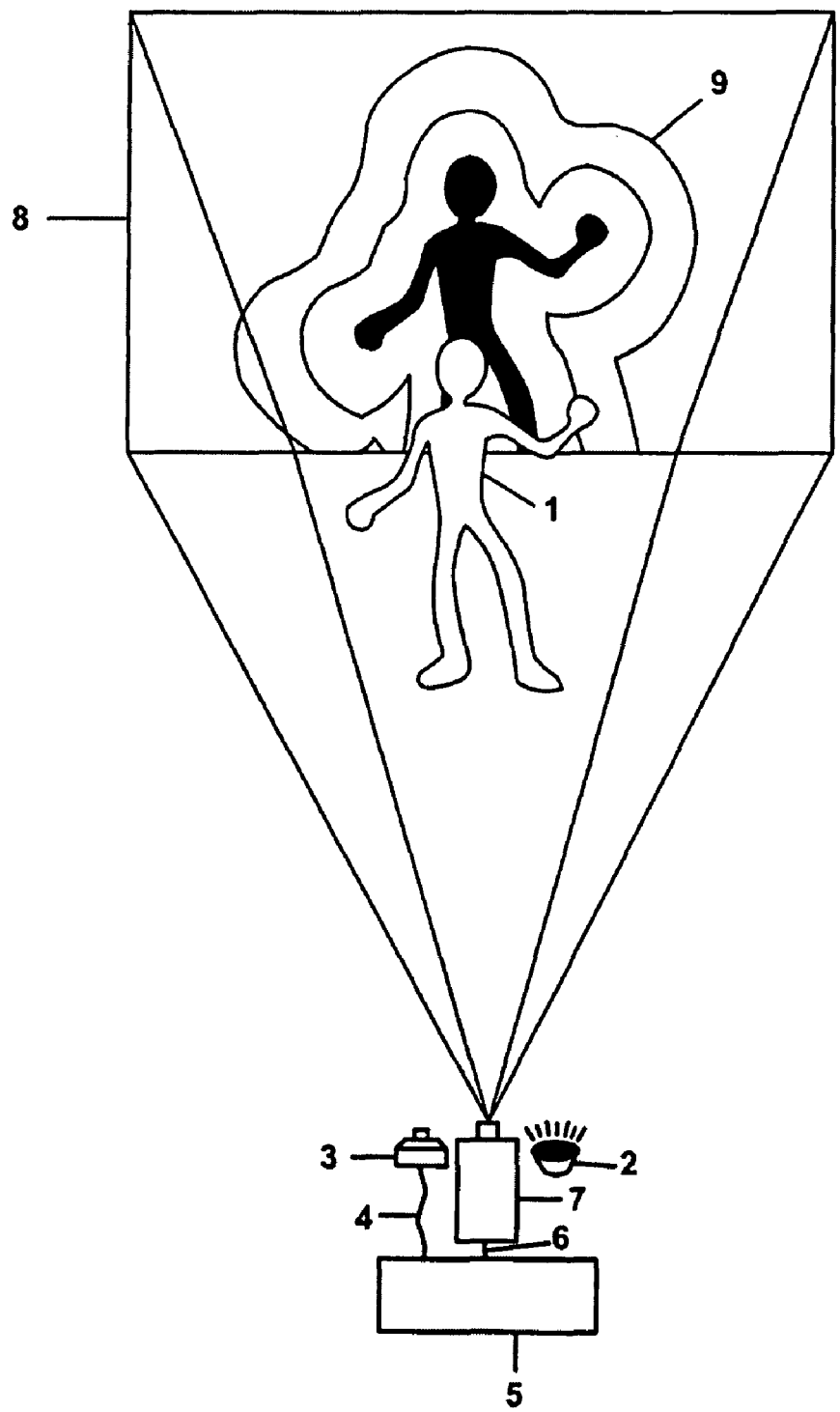
FIG. 1 shows a first configuration of a preferred embodiment using a co-located projector and camera.

FIG. 1 shows a front-projection embodiment of the invention using a co-located camera and projector. In FIG. 1, a person 1 is illuminated by an infrared (or other non-visible light) lamp 2. The image of the person is photographed by an infrared (or other non-visible light) camera 3. This signal is transmitted real-time 4 to computer 5. The computer performs the object detection algorithm, and generates the video effect in real time. The effect is transmitted 6 real-time to video projector 7. The projector projects the resulting image onto a screen 8 or some other surface. The video effect is then displayed 9 on the screen, in real time, and aligned with the person.

Figure 2:
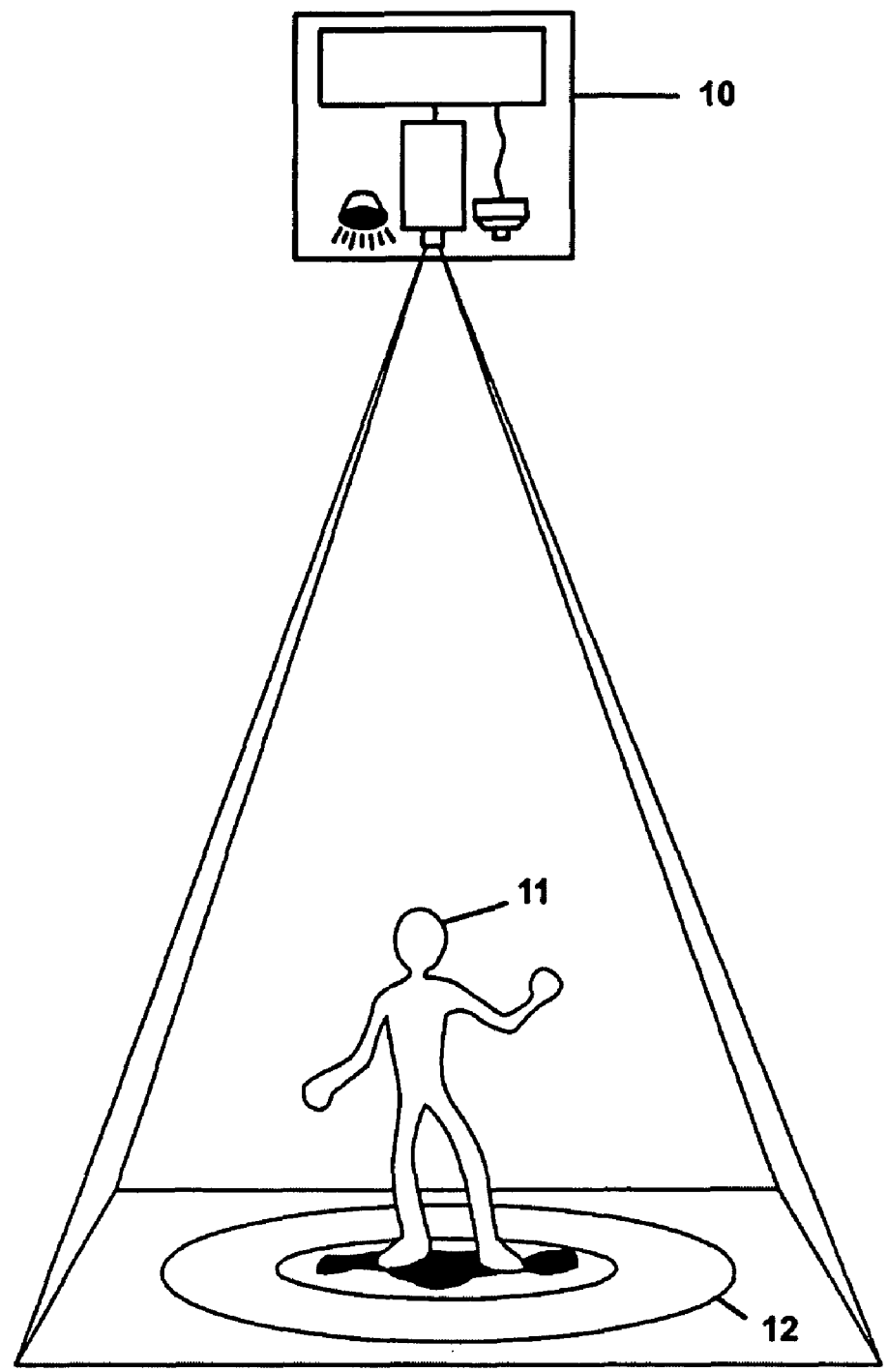
FIG. 2 shows an overhead projection configuration.

FIG. 2 shows an overhead projection configuration of the system. Component 10 includes the aforementioned system. Component 10 is shown mounted vertically here, but the camera, projector, and light source within 10 can also be mounted horizontally and then redirected downwards with a mirror. A person moving on the ground 11 can have the video signal projected onto the ground around them 12. The person's own shadow obscures a minimal amount of the image when the projector is directly overhead.

Figure 3:
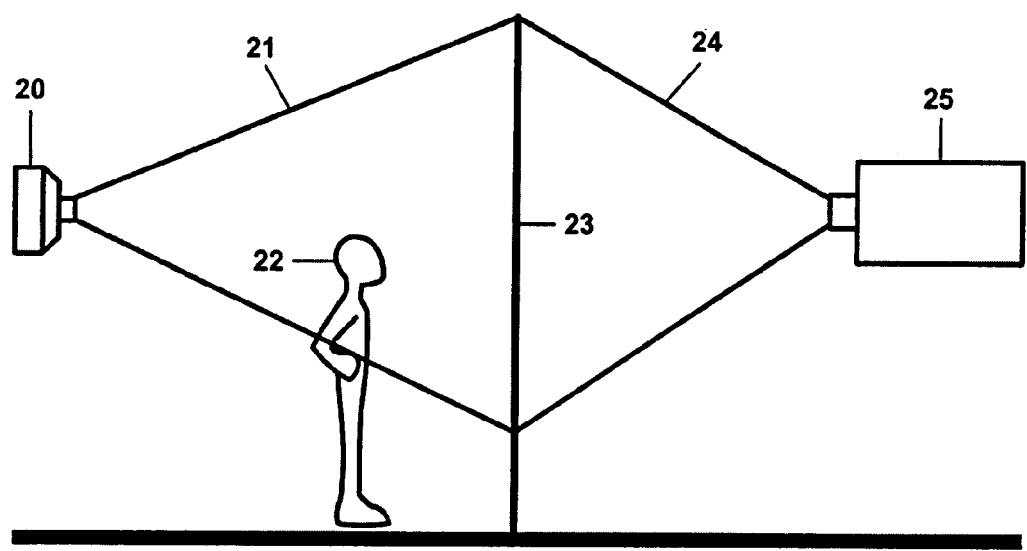
FIG. 3 shows a rear-projection configuration.
Figure 4:
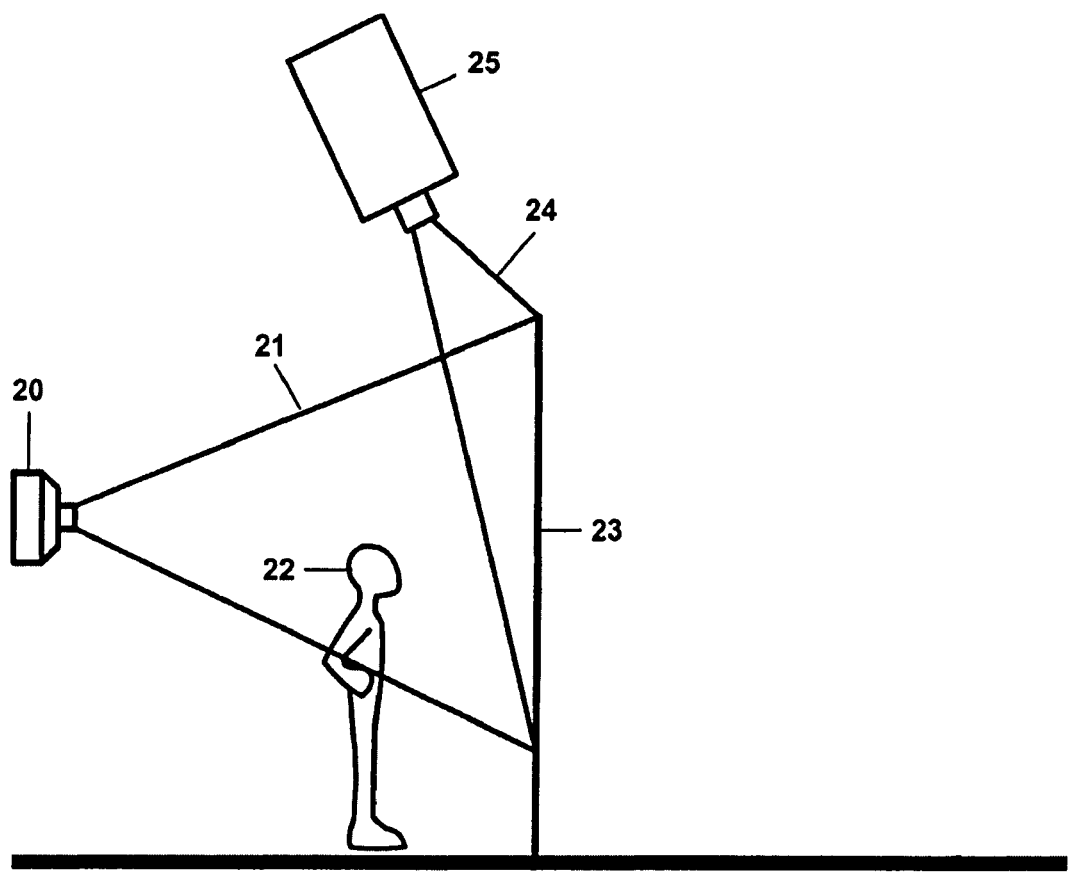
FIG. 4 shows a side-projection configuration.

FIGS. 3 and 4 show two more alternate configurations for the camera and projector. In both figures, camera 20 captures objects such as a person 22 in front of a screen 23. The angle viewed by the camera is shown at 21. In FIG. 3 projector 25 is placed behind the screen. The cast light from projector 24 can be seen on the screen from both sides. In FIG. 4, projector 25 is at an oblique angle to the screen; its light cone 24 is shown. Both of these configurations make it more likely that there are no shadows obstructing the projected image.

As described in the configurations, above, a video camera is used to capture the scene at a particular location for input into the computer. In most configurations of the device, the camera views part of the output video display. To prevent unwanted video feedback, the camera can operate at a wavelength that is not used by the video display. In most cases, the display will use the visible light spectrum. In this case, the camera must photograph in a non-visible wavelength, such as infrared, so that the video display output is not detected.

The scene being videotaped must be illuminated in light of the camera's wavelength. In the case of infrared, sources including sunlight, a heat lamp or infrared LEDs can be used to illuminate the scene. These lights can be positioned anywhere; however, the camera's view of spurious shadows from these lights can be minimized by placing the light source in proximity to the camera. A light source, such as one or more lights, can illuminate objects with a uniform lighting, as opposed to the patterned illumination discussed, below. In a preferred embodiment, the video signal is exported in real-time to the computer. However, other embodiments need not achieve real-time or near-real-time and can process object or video images (i.e., display images) at times considerably prior to displaying the images.

This component is designed to be modular; any computer software that utilizes the video input from the previous component and outputs the results to a video display can be used here.

Most instances of this component will have two parts: the first part handles the detection of mobile objects from static background, while the second part utilizes the object information to generate a video output. Numerous instances of each part will be described here; these instances are simply meant to be examples, and are by no means exhaustive.

In the first part, the live image from the video camera is processed real-time in order to separate mobile objects (e.g. people) from the static background, regardless of what the background is. The processing can be done as follows:

First, input frames from the video camera are converted to grayscale to reduce the amount of data and to simplify the detection process. Next, they may be blurred slightly to reduce noise.

Any object that does not move over a long period of time is presumed to be background; therefore, the system is able to eventually adapt to changing lighting or background conditions. A model image of the background can be generated by numerous methods, each of which examines the input frames over a range of time. In one method, the last several input frames (or a subset thereof) are examined to generate a model of the background, either through averaging, generating the median, detecting periods of constant brightness, or other heuristics. The length of time over which the input frames are examined determines the rate at which the model of the background adapts to changes in the input image.

In another method, the background model is generated at each time step (or more infrequently) by computing a weighted average of the current frame and the background model from the previous time step. The weight of the current frame is relatively small in this calculation; thus, changes in the real background are gradually assimilated into the background model. This weight can be tuned to change the rate at which the background model adapts to changes in the input image.

An object of interest is presumed to differ in brightness from the background. In order to find objects at each time step, the current video input is subtracted from the model image of the background. If the absolute value of this difference at a particular location is larger than a particular threshold, then that location is classified as an object; otherwise, it is classified as background.

The second part can be any program that takes the object/background classification of an image (possibly in addition to other data) as input, and outputs a video image based on this input, possibly in real time. This program can take on an infinite number of forms, and is thus as broadly defined as a computer application. For example, this component could be as simple as producing a spotlight in the shape of the detected objects, or as complicated as a paint program controlled through gestures made by people who are detected as objects. In addition, applications could use other forms of input, such as sound, temperature, keyboard input etc. as well as additional forms of output, such as audio, tactile, virtual reality, aromatic, etc.

One major class of applications includes special effects that use the object/background classification as input. For example, stars, lines, or other shapes could be drawn in the output video image in a random portion of the locations that were classified as "object". These shapes could then be set to gradually fade away over time, so that people leave transient trails of shapes behind them as they move around. The following are examples of other effects in the same class:

contours and ripples surrounding the objects; a grid which is deformed by the presence of objects; simulations of flame and wind, and other matrix convolutions applied to objects; and special effects that pulse to the beat of the music, which is detected separately.

Another major class of applications allows the real objects to interact with virtual objects and characters. For example, an image showing a group of ducklings could be programmed to follow behind any real object (e.g. a person) that walks in front of the display.

In addition, computer games that can be played by people moving in front of the camera form another class of applications.

However, this list is not exclusive; this component is designed to be programmable, and thus can run any application.

The output of the processing software from the previous component is displayed visually. Possible displays include, but are not limited to video projectors, televisions, plasma displays, and laser shows. The displayed image can be aligned with the video camera's input range so that the video effects align with the locations of the people causing them. Since some configurations of the video camera can detect objects in non-visible light, the problem of the display interfering with the camera is avoided.

There are numerous possible configurations for the different components. For example, the camera and a video projector can be in the same location and pointed in the same direction. The camera and projector can then be pointed at a wall as shown in FIG. 1, pointed at the ground, redirected with a mirror as shown in FIG. 2, or pointed at any other surface. Alternatively, the projector could be placed behind the screen as shown in FIG. 3 so that the display is identical to the one in FIG. 1, but the person is no longer in the way of the projection, so they do not cast a shadow. The shadow could also be avoided by placing the projector at an oblique angle to the screen as shown in FIG. 4. The video display could also be a large-screen TV, plasma display, or video wall. While the aforementioned configurations all have the video display lined up with the video input, this is not necessary; the video display could be placed anywhere. The preceding list is not exhaustive; there are numerous additional possible configurations.

The overall system can be networked, allowing vision information and processing software state information to be exchanged between systems. Thus an object detected in the vision signal of one system can affect the processing software in another system. In addition, a virtual item in the display of one system could move to other systems. If the displays of multiple systems are aligned together so that they form a single larger display, then the multiple systems can be made to function as if they were a single very large system, with objects and interactions moving seamlessly across display boundaries.

One common problem with the vision system is that, in cases where there is uncontrollable ambient illumination (e.g. sunlight) of the camera's viewable area from a significantly different angle than the camera, objects cast shadows onto the background. If these shadows are strong enough, the vision system may mistake them for objects. These shadows can be detected and removed by strobing the camera's light source. By subtracting a camera input image with ambient light alone from a camera input image with both the ambient light and the camera's light, the system yields an image that captures the scene as if only the camera's light were being used, thus eliminating the detectable shadows from the ambient light.

Additional accuracy in detecting objects with the images captured by the camera can be obtained by using patterned illumination or patterned markings.

One shortcoming of using a simple floodlight illumination system for computer vision is that if the colors of objects being viewed by the camera are very similar, then the objects can be very difficult to detect. If the camera operates in monochrome it is much more likely for the object and background to look the same.

Using a patterned object to cover camera's viewable area can improve object detection. If a pattern that contains two or more colors intermingled in close proximity is used, it is highly unlikely that other objects will have a similar look since at least one color of the pattern will look different from the color of surrounding objects. If a patterned object, such as a screen, is used as a background before which are the objects to be detected, then objects that pass in front of the patterned screen are more easily detected by the vision algorithm.

For example, in an infrared vision application the patterned object could be a background mat that appears white to the human eye, but contains a light & dark checkered pattern that is invisible to the human eye but visible to the camera. By using a pattern that is not in the visible light spectrum, the patterned mat will not interfere with the aesthetics of the system. The display system (e.g., projection video) can project output images onto the mat, as described above. A process executing on a processing system such as a computer system can be provided with the background pattern, thus making detection of an object in front of the mat easier, although the system could learn the patterned background in the same way that the vision algorithm learns any other background. Also, the ability of the system to adapt to changes in background light brightness would not be adversely affected.

A patterned illumination can also be projected from a light source onto the camera's viewable area. As long as the camera and invisible light source are in different, offset locations, parallax effects will cause the camera's view of the projected pattern to be distorted as objects move through the camera's viewing area. This distortion helps make objects that have similar colors stand out from each other. If the difference between the two images seen by the camera is taken, the result will show the shape of any object that has appeared, disappeared, or moved between the two images. If the image of an object in front of the background is subtracted from an image of the background alone, the result is an image that is zero where there is background and nonzero where there are other objects. This technique can be used in combination with other aspects of the invention discussed, herein.

A patterned light source can be achieved through several means. One method is to use an infrared light-emitting diode (LED) cluster or another non-visible light source in a slide projector. A set of lenses would be used to focus the light source through a slide containing the desired pattern, thus casting the pattern's image onto the camera's viewing area. In another method, an infrared laser beam could be shined onto a laser pattern generator or other scattering device in order to produce a light pattern on the camera's viewing area. Light can be deflected, shuttered, scanned, etc., in order to achieve a pattern. Many other approaches are possible.

A patterned light source is also useful for 3-D computer vision. 3-D computer vision techniques such as the Marr-Poggio algorithm take as input two images of the same scene taken from slightly different angles. The patterns on the images are matched up to determine the amount of displacement, and hence the distance from the camera, at each point in the image. The performance of this algorithm degrades when dealing with objects of uniform color because uniform color makes it difficult to match up the corresponding sections in the image pair. Thus, the patterned light source can improve the distance estimates of some 3D computer vision algorithms.

The two input images to these 3-D vision algorithms are usually generated using a pair of cameras pointed at the scene. However, it would also be possible to use only one camera. The second image could be an entirely undistorted version of the projected pattern, which is known ahead of time. This image of the pattern is essentially identical to what a second camera would see if it were placed at the exact same location as the patterned light source. Thus, the single camera's view and the projected pattern together could be used as an input to the 3-D vision algorithm. Alternatively, the second image could be an image of the background alone, taken from the same camera.

While many different kinds of patterns can be used, a high-resolution random dot pattern has certain advantages for both 2-D and 3-D vision. Due to the randomness of the dot pattern, each significantly sized section of the dot pattern is highly unlikely to look like any other section of the pattern. Thus, the displaced pattern caused by the presence of an object in the viewing area is highly unlikely to look similar to the pattern without the object there. This maximizes the ability of the vision algorithm to detect displacements in the pattern, and therefore objects. Using a regular pattern such as a grid can cause some difficulty because different sections of the pattern are identical, causing the displaced pattern to often look like the non-displaced pattern.

Figure 5D:
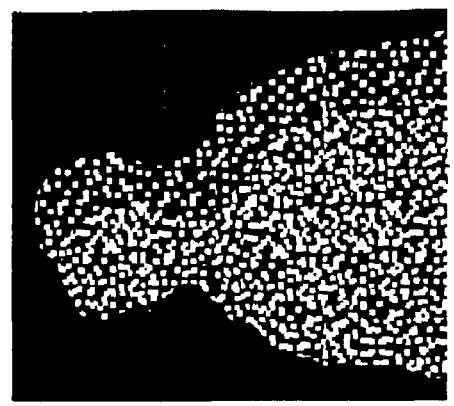
FIG. 5D shows a result of detecting a subject from a background using random dot pattern illumination.
Figure 5C:
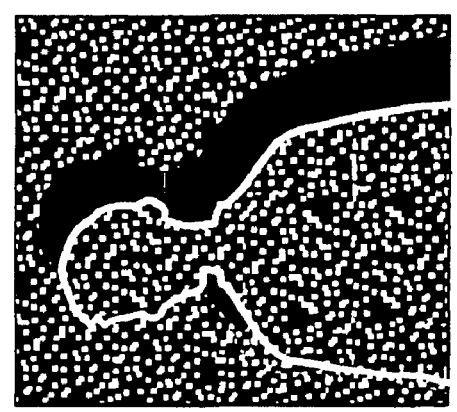
FIG. 5C illustrates a subject and background under random dot pattern illumination.
Figure 5B:
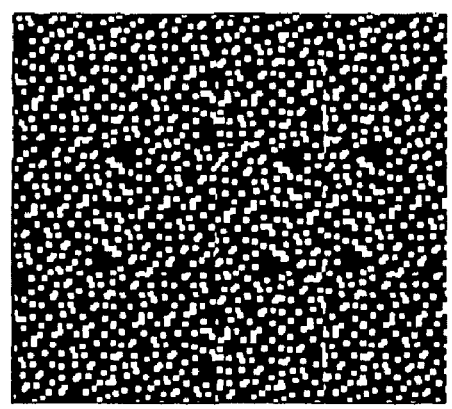
FIG. 5B illustrates a background under random dot pattern illumination.
Figure 5A:
FIG. 5A illustrates a subject under uniform illumination.

FIGS. 5A-D show the usefulness of a random dot pattern in detecting an object. FIG. 5A shows a picture of a person under normal illumination. The person has a similar brightness to the background, making detection difficult. In FIG. 5B, a random dot pattern is projected onto the background from a light source near the camera. When the person stands in front of this pattern, the pattern reflected off of the person is displaced, as shown in FIG. 5C. By taking the difference between the images in FIGS. 5B and 5C, the image of FIG. 5D is obtained which defines the image area of the person with a strong signal.

Other approaches can be used to improve object detection. For example, a light source can be "strobed" or turned on-and-off periodically so that detection of shadows due to other light sources (e.g., ambient light) is made easier.

Once an object has been detected and defined the preferred embodiment uses a gradient aura to determine degree and direction of interaction of the object with a displayed image item.

Figure 6A:
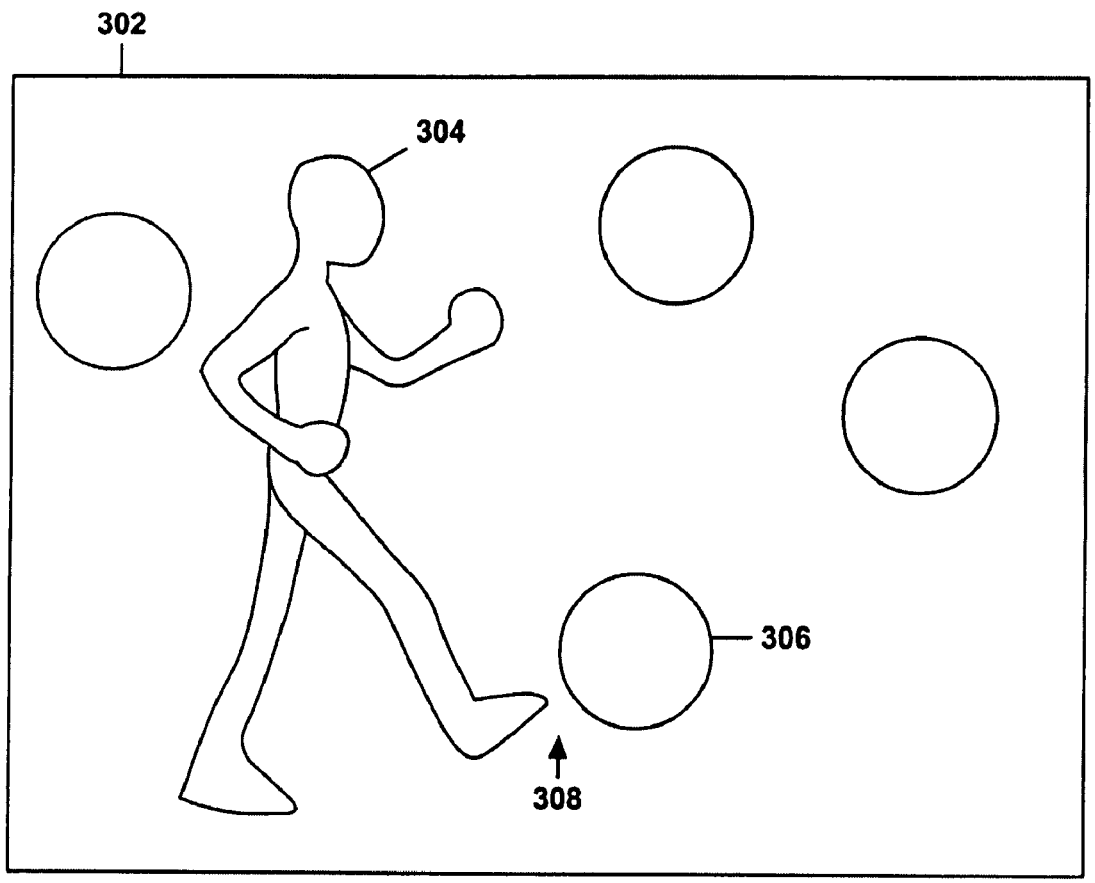
FIG. 6A shows a human user interacting with a video object.

FIG. 6A shows a human user interacting with a video object.

In FIG. 6A, object 304 has been detected and is shown in outline form. One representation of the object within a computer's processing can use the outline definition depicted in FIG. 6A. Video screen 302 displays several image items, such as image 306 of a ball.

Figure 6B:
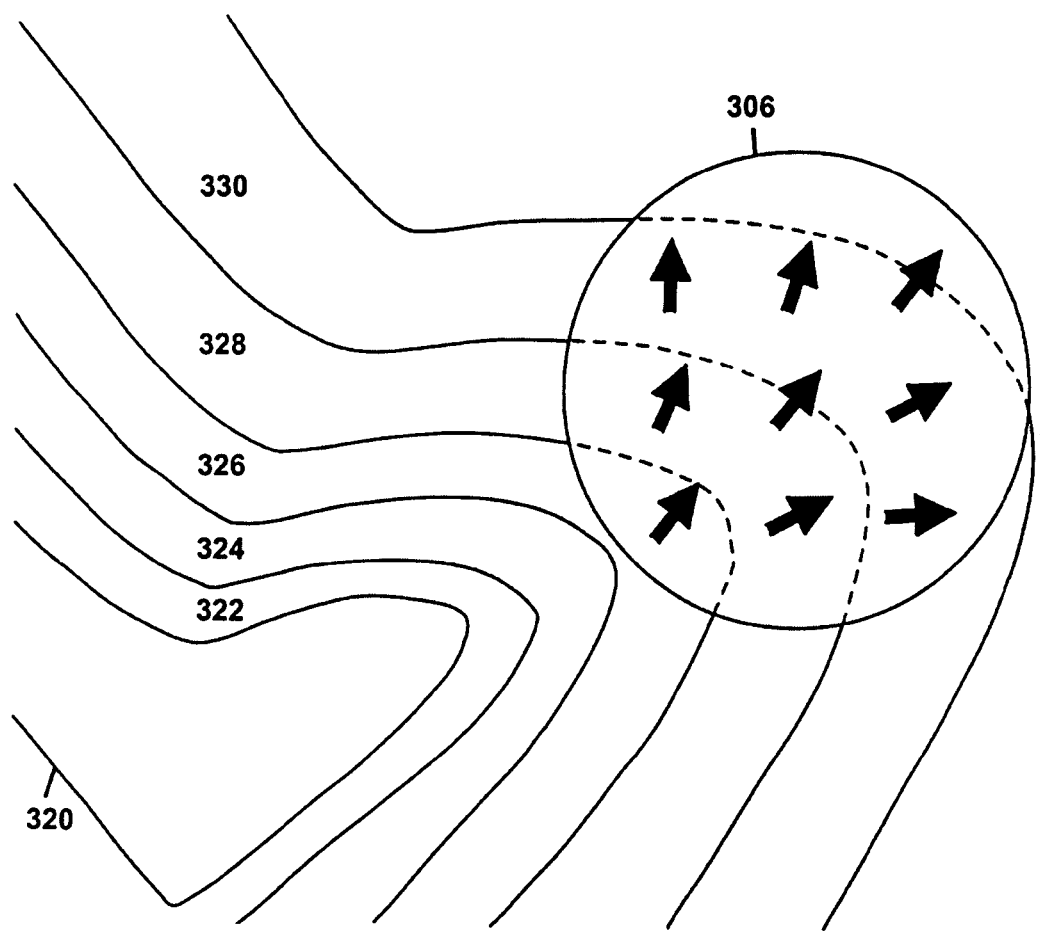
FIG. 6B illustrates an influence image.

FIG. 6B illustrates an influence image for the region of 308 of FIG. 6A.

In FIG. 6B, the outline image of the user's foot 320 and lower leg are used to generate successively larger outline areas. The original outline area 320's region is assigned a large pixel brightness value corresponding to white. Each successive outline area, 322, 324, 326, 328, 330 is assigned a progressively lower value so that a point farther away from the initial outline (white) area will have a lower pixel value. Note that any number of outline areas can be used. Also, the size and increments of outline areas can vary, as desired. For example, it is possible to use a continuous gradient, rather than discrete areas. The collection of all outline areas is referred to as the "influence image."

The influence image is compared to different image items. In FIG. 6B, ball item 306 impinges upon gradient areas 326, 328 and 330. As is known in the art, direction lines are determined in the direction of the gradient of the pixel value field for the impinged areas. FIG. 6B shows three example direction lines within item 306. The direction lines can be combined, e.g., by averaging, or a select single line can be used. The processing also detects that the brightest outline area impinged by the item is outline area 326. Other approaches are possible. For example, the brightness and gradient can be averaged over every point in the area of the image item, or on a subset of those points. Also, some embodiments can include duration of contact as a factor in addition to the brightness and gradient.

The interaction between an object, such as a person, and an item on the screen is computed using both the brightness of impinged outline areas and the direction as computed using one or more direction lines. The impinged brightness corresponds to the strength with which the user is "touching" the item. The gradient corresponds to the direction in (or from, depending on the sign of the calculation) which the item is being touched.

Although the invention has been discussed with reference to specific embodiments thereof, these embodiments are illustrative, not restrictive, of the invention. For example, although the preferred embodiments use a camera as a detector, different types of detection devices can be employed. The camera can be digital or analog. A stereo camera could be used in order to provide depth information as well as position. In cases where processing and display are not done in real time, film and other types of media can be used and followed up by a digital conversion before inputting the data to a processor. Light sensors or detectors can be used. For example, an array of photodetectors can be used in place of a camera. Other detectors not contemplated herein can be used with suitable results.

In general, any type of display device can be used with the present invention. For example, although video devices have been described in the various embodiments and configurations, other types of visual presentation devices can be used. A light-emitting diode (LED) array, organic LED (OLED), light-emitting polymer (LEP), electromagnetic, cathode ray, plasma, mechanical or other display system can be employed.

Virtual reality, three-dimensional or other types of displays can be employed. For example, a user can wear imaging goggles or a hood so that they are immersed within a generated surrounding. In this approach, the generated display can align with the user's perception of their surroundings to create an augmented, or enhanced, reality. One embodiment may allow a user to interact with an image of a character. The character can be computer generated, played by a human actor, etc. The character can react to the user's actions and body position. Interactions can include speech, co-manipulation of objects, etc.

Multiple systems can be interconnected via, e.g., a digital network. For example, Ethernet, Universal Serial Bus (USB), IEEE 1394 (Firewire), etc., can be used. Wireless communication links such as defined by 802.11b, etc., can be employed. By using multiple systems, users in different geographic locations can cooperate, compete, or otherwise interact with each other through generated images. Images generated by two or more systems can be "tiled" together, or otherwise combined to produce conglomerate displays.

Other types of illumination, as opposed to light, can be used. For example, radar signals, microwave or other electromagnetic waves can be used to advantage in situations where an object to detect (e.g., a metal object) is highly reflective of such waves. It is possible to adapt aspects of the system to other forms of detection such as by using acoustic waves in air or water.

Although computer systems have been described to receive and process the object image signals and to generate display signals, any other type of processing system can be used. For example, a processing system that does not use a general-purpose computer can be employed. Processing systems using designs based upon custom or semi-custom circuitry or chips, application specific integrated circuits (ASICs), field-programmable gate arrays (FPGAs), multiprocessor, asynchronous or any type of architecture design or methodology can be suitable for use with the present invention.

In one embodiment, the wavelength of the lamp 2 can be chosen to be as uniform as possible. A narrow bandpass filter, which only passes light of the wavelengths put out most strongly by lamp 2, can be added to the front of camera 3.

Lamp 2 and camera 3 can be strobed. Some illumination source, such as light emitting diodes (LEDs), that can turn on far brighter for brief periods than they can continuously. If lamp 2 is turned on only during the exposure of camera 3, and the camera exposure is brief enough, the brightness of lamp 2 is greatly magnified relative to the ambient light. This is true because the image of camera 3 during a short exposure in which lamp 2 is turned on very brightly will contain much less ambient light but nearly as much light from lamp 2 as compared to an image from a longer exposure in which lamp 2 is on continuously but at a lower, continuous-duty brightness.

Camera 3 and lamp 2 can be synchronized. For example, a microcontroller or other electronic circuit can either read or set the camera exposure sync and trigger pulsed power to lamp 2 at the appropriate time.

The performance of strobing can be further improved by only turning on lamp 2 during every second camera exposure. Thus, camera 3 would alternate between an exposure with lamp 2 on and one with lamp 2 off. Since the goal is to remove the ambient infrared light, computer 5 can continuously generate an image with no ambient light by taking the difference between the current image and the previous image. Because lamp 2 is lit only on every second frame, one image will have only ambient infrared light while the other will have the ambient infrared light plus the light of lamp 2. By taking the pixel-wise difference between the current and previous images, the ambient infrared can be canceled out, leaving only the light of lamp 2.

In the case of an interlaced CCD camera, flashing lamp 2 on during alternate exposures would produce camera output images in which the even-numbered lines have lamp 2 on and the odd-numbered lines have lamp 2 off. Thus, instead of comparing two images, computer 5 can take the difference between the odd numbered lines and the even numbered lines to subtract out the ambient light. The strobing could be performed using two cameras 3, timed so that the first and second cameras take their exposures at slightly different times, and the lamp 2 is only on for one of the two exposures. Alternately, the two cameras could be sensitive to slightly different wavelengths, and the lamp 2 only emits light at the second wavelength.

In another embodiment, in an environment with no ambient infrared light, strobing lamp 2 for only every second exposure reduces the system's reaction time. Any movement when lamp 2 is off will not be noticed during the second exposure. However, this can be improved by turning only part of lamp 2 off, or simply reducing the power pf lamp 2, during every second exposure. Then, lamp 2 alternates between "all the way on" and "partly on." When computer 5 takes the difference between the current exposure and the previous exposure, the result will contain no ambient infrared and part of the light of lamp 2. This configuration will provide the fastest possible reaction time for the user in both environments with no ambient infrared and some ambient infrared.

The embodiments discussed herein are illustrative of the present invention. As these embodiments are described with reference to illustrations, various modifications or adaptations of the methods or specific elements described may become apparent to those skilled in the art. All such modifications, adaptations, or variations that rely on the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A video gaming system comprising:
   a camera system operable to provide images of an object; and
   a computing device configured to
   receive the images from the camera system,
   drive a display system, and
   generate an influence image comprising a plurality of outline areas partially surrounding a representation of the object and positioned successively further away from the representation of the object, wherein a portion of the plurality of outline areas that impinge at least one virtual object are used to estimate a strength and a direction of an interaction with the at least one virtual object.

2. The video gaming system of claim 1, wherein the computing device comprises a video game system.

3. The video gaming system of claim 2, wherein the computing device is further configured to drive the display system to display one or more video images comprising the representation of the object and the at least one virtual object.

4. The video gaming system of claim 3, wherein the display system comprises one or more of a television, a monitor, an LED display, a plasma display, and a video projector.

5. A method of tracking an object, the method configured for execution by a computing system comprising one or more computing devices, the method comprising:
    receiving at a computing system a plurality of images of an object from a detector;
    generating an influence image comprising a plurality of outline areas that partially surround the object and are positioned successively further away from the object;
    transmitting video images for display on a display device, the video images including a virtual object and a representation of the object; and
    based at least on a position of the plurality of outline areas associated with the object in the influence image and a position of the virtual object in one or more of the video images, detecting a strength and a direction of an interaction between the object and the virtual object when the influence image impinges the virtual object.

6. The method of claim 5, wherein the representation of the object comprises a representation of a user.

7. A gaming system comprising:
    a camera system operable to provide images of an object;
    a display system operable to render video images; and
    a computing device coupled to receive the images from the camera system and coupled to drive the display system, the computing device operable to determine at least one of a strength or a direction of an interaction between the object and a virtual object included in the video images based on at least a location of the virtual object in relation to one or more computer-generated outline areas that partially surround the object and are positioned successively further away from the object and have progressively lower pixel values as the outline areas are further away from the object.

8. The gaming system of claim 7, wherein the display system comprises one or more of a television, a monitor, an LED display, a plasma display, and a video projector.

9. The gaming system of claim 7, wherein the computing device comprises a video game system.

10. The gaming system of claim 7, wherein the video images comprise a representation of the object.

11. The gaming system of claim 7, wherein the object is a user.

12. The system of claim 7, wherein the video images further comprise the virtual object.

13. The gaming system of claim 7, wherein the virtual object is a ball.

* * * * *